United States Patent
Kihara et al.

(10) Patent No.: US 7,879,298 B2
(45) Date of Patent: Feb. 1, 2011

(54) MICROREACTOR

(75) Inventors: Takeshi Kihara, Shinjuku-ku (JP); Hiroshi Yagi, Shinjuku-ku (JP); Akihiko Takeuchi, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 319 days.

(21) Appl. No.: 12/282,074

(22) PCT Filed: Nov. 20, 2007

(86) PCT No.: PCT/JP2007/072883

§ 371 (c)(1),
(2), (4) Date: Sep. 8, 2008

(87) PCT Pub. No.: WO2008/062896

PCT Pub. Date: May 29, 2008

(65) Prior Publication Data

US 2009/0047192 A1    Feb. 19, 2009

(30) Foreign Application Priority Data

Nov. 24, 2006    (JP) ............................. 2006-316710

(51) Int. Cl.
*B01J 19/00* (2006.01)
*B01J 8/00* (2006.01)
*B01J 8/04* (2006.01)
*B01J 10/00* (2006.01)
*B01J 7/00* (2006.01)
*B01J 7/02* (2006.01)

(52) U.S. Cl. .................... 422/198; 422/129; 422/130; 422/187; 422/188; 422/189; 422/190; 422/236; 48/61

(58) Field of Classification Search ......... 422/129–130, 422/187–190, 198, 236; 48/61, 118.5; 540/30
See application file for complete search history.

(56) References Cited

U.S. PATENT DOCUMENTS

| 6,939,632 | B2 | 9/2005 | Arana et al. |
| 2003/0077021 | A1 | 4/2003 | Nystrom |
| 2006/0051260 | A1 | 3/2006 | Yagi et al. |
| 2007/0071653 | A1* | 3/2007 | Miyamoto et al. .......... 422/129 |

(Continued)

FOREIGN PATENT DOCUMENTS

JP    2003 43387    2/2003

(Continued)

*Primary Examiner*—Walter D Griffin
*Assistant Examiner*—Natasha Young
(74) *Attorney, Agent, or Firm*—Oblon, Spivak, McClelland, Maier & Neustadt, L.L.P.

(57) ABSTRACT

A microreactor (1) comprises a vacuum casing (2), a microreactor proper (4) located in a vacuum-tight cavity (3) in the vacuum casing (2), and a getter heat-generation substrate (6) positioned on at least one surface of the microreactor proper (4). The microreactor proper (4) has a feed inlet (19a) connected to outside the vacuum casing (2) by way of a feed supply pipe (5A) and a gas outlet (19b) connected to outside the vacuum casing (2) by way of a gas discharge pipe (5B). The getter heat-generation substrate (6) comprises a substrate (7), and a heat generator (9) and a getter material layer (10) that are located on the substrate (7) alternately in mutual non-contact fashion.

7 Claims, 11 Drawing Sheets

U.S. PATENT DOCUMENTS

2007/0148502 A1 * 6/2007 Terazaki .................. 429/12

FOREIGN PATENT DOCUMENTS

| JP | 2003 290649 | 10/2003 |
|---|---|---|
| JP | 2004 290880 | 10/2004 |
| JP | 2004 537425 | 12/2004 |
| JP | 2005 97089 | 4/2005 |
| JP | 2007 176760 | 7/2007 |

* cited by examiner

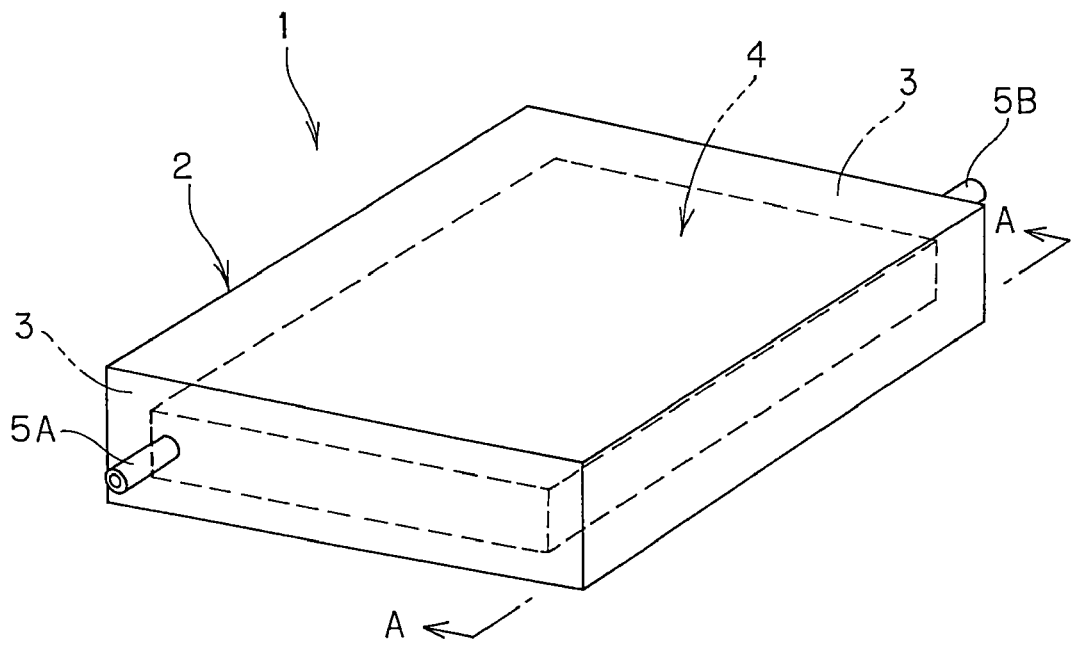
F I G. 1
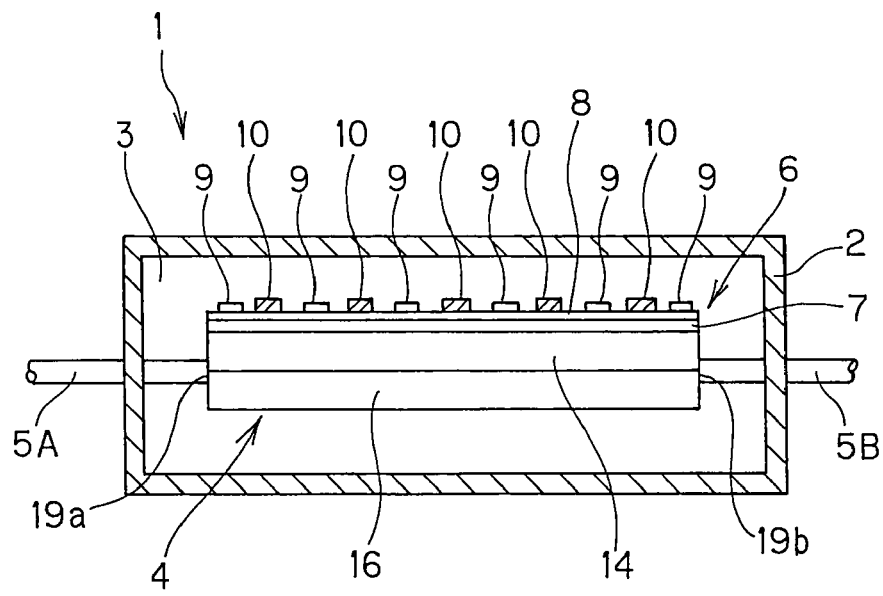
F I G. 2

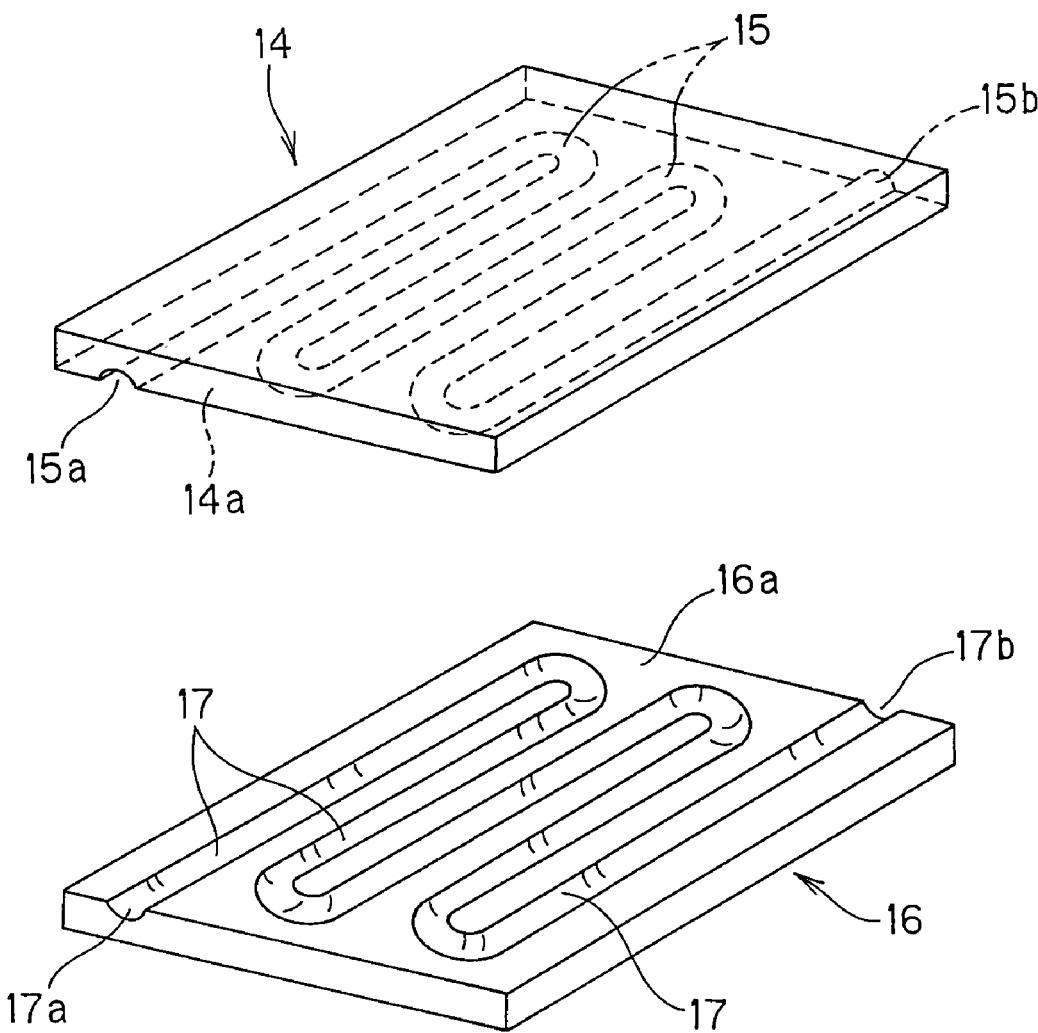
F I G. 5

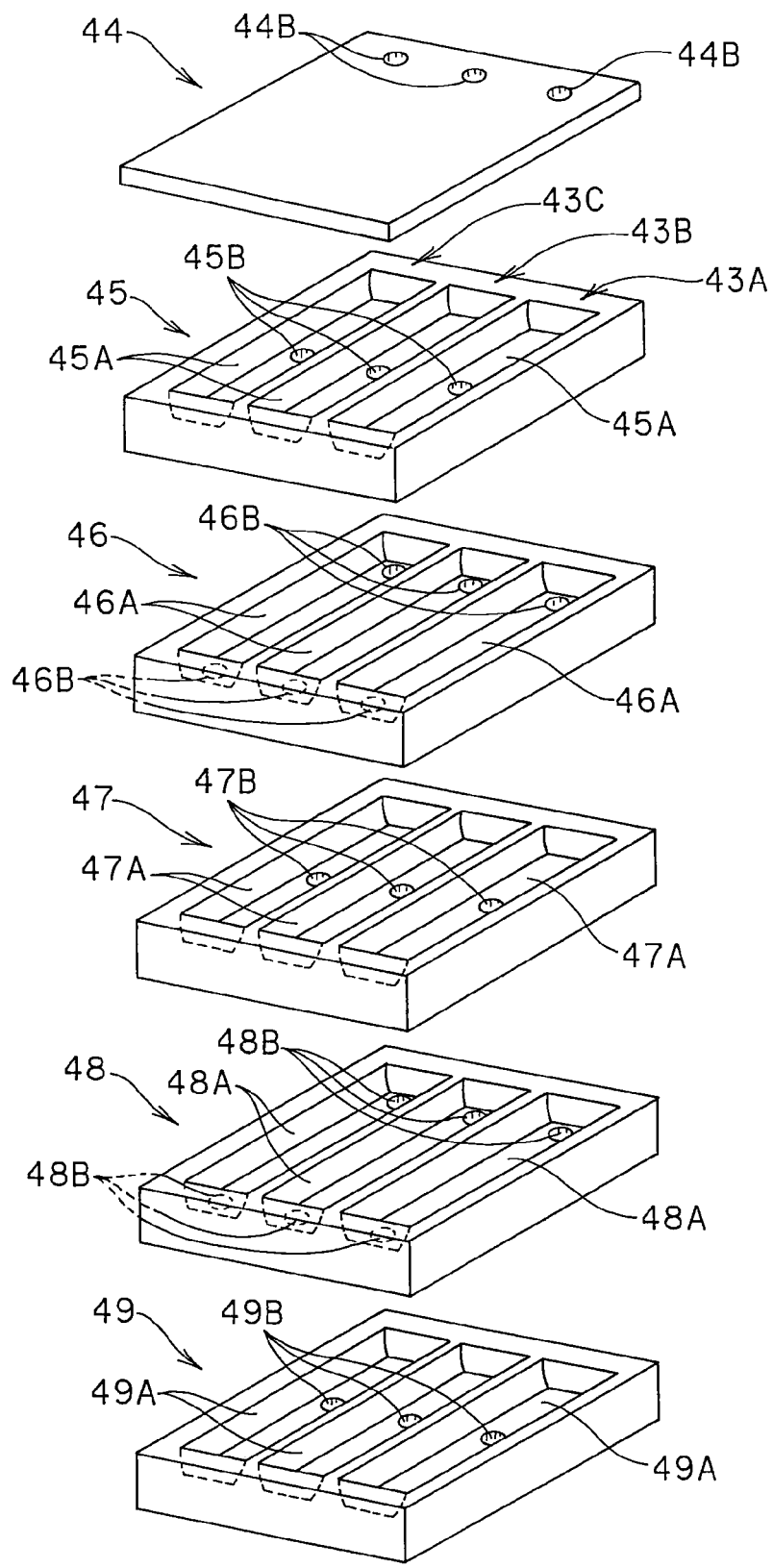
F I G. 14

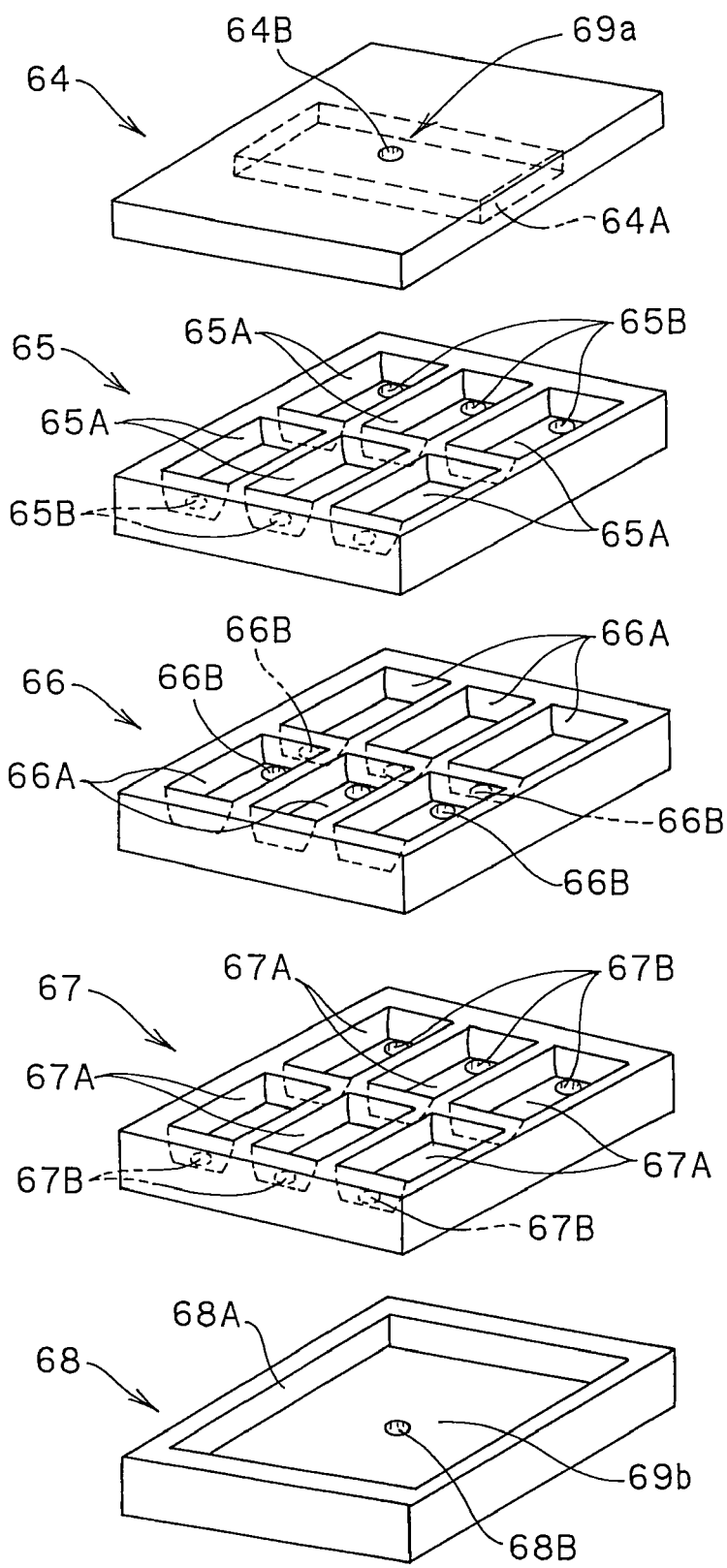
F I G. 16

MICROREACTOR

ART FIELD

The present invention relates generally to a microreactor, and more particularly to a microreactor adapted to keep the desired reactions going on by a carried catalyst.

BACKGROUND ART

So far, reactors harnessing catalysts have been used in various fields, and they are best designed depending on what purposes they are used for.

On the other hand, use of hydrogen as fuel has recently attracted attention, partly because of no spewing of such global warming gas as carbon dioxide in terms of global environmental protection, and partly because of high energy efficiency. Fuel cells in particular have gained attention, partly because they can convert hydrogen direct into electric power, and partly because they are capable of high energy conversion efficiency in cogeneration systems making use of generated heat. The fuel cells have hitherto been used under more specific conditions: for space development, ocean development, etc., and they are now going as far as the development of automobiles, and domestic distribution power sources, and fuel cells for portable equipments are now under development as well.

For the fuel cells for portable equipments size reductions are essentially in need; size reductions of reformers adapted to modify hydrocarbon fuel with steam to generate hydrogen gas are under studies. For instance, there are various microreactors developed that have a microchannel in a metal, silicon, ceramic or other substrate with catalysts carried in it (JP(A) 2002-252014).

With a conventional microreactor, an outer wall is often forced into a high temperature state of 200° C. or hither for the reasons of heating with a heat generator for keeping the desired endothermic reaction going on by a carried catalyst and heat generation from an exothermic reaction. When the microreactor is used with portable equipment or the like, therefore, it is required to insulate heat between the microreactor in the high temperature state and the surrounding devices or parts.

However, to locate a known heat insulator such as one formed of glass wool or ceramic material around the microreactor in the high temperature state thereby reducing the outer wall temperature of the insulator down to about normal temperature to about 50° C., that insulator must have a large thickness, offering a problem that it cannot practically be used for portable equipment for which size reductions are demanded.

DISCLOSURE OF THE INVENTION

An object of the invention is to provide a micro-reactor of high reliability that is capable of high-efficiency catalytic reactions while influences of heat on outside are held back.

According to the invention, such an object is accomplishable by the provision of a microreactor, characterized by comprising a vacuum casing, a micro-reactor proper located in a vacuum-tight cavity in said vacuum casing, and a getter heat-generation substrate positioned on at least one surface of said microreactor proper, wherein said microreactor proper has a feed inlet and a gas outlet, wherein said feed inlet is connected to outside said vacuum casing by way of a feed supply pipe and said gas outlet is connected to outside said vacuum casing by way of a gas discharge pipe, and said getter heat-generation substrate comprises a substrate, and a heat generator and a getter material layer that are located on said substrate alternately in a mutual non-contact state.

In an embodiment of the invention, said substrate of said getter heat-generation substrate is a metal substrate, and said heat generator and said getter material layer are located on said metal substrate via an electric insulating layer.

In another embodiment of the invention, said substrate of said getter heat-generation substrate is a metal substrate forming said microreactor proper, and said heat generator and said getter material layer are located on said metal substrate via an electric insulating layer.

In a further embodiment of the invention, said microreactor proper comprises an assembly wherein one set of metal substrates are joined together, a tunnel passage defined by a fine groove formed on the joining surface of at least one of said one set of metal substrates, a catalyst carrier layer formed at said tunnel passage, and a catalyst carried on said catalyst carrier layer, wherein said feed inlet and said gas outlet communicate with said tunnel passage, and said catalyst carrier layer is an inorganic oxide coating.

In a further embodiment of the invention, said microreactor proper comprises an assembly wherein three or more metal substrates are stacked and joined together, a passage formed within said assembly, a catalyst carrier layer formed at said passage and a catalyst carried on said catalyst carrier layer, wherein at least an intermediate metal substrate has a groove formed on at least one joining surface, and a through-hole formed in said groove, said passage is defined by said groove and said through-hole, said feed inlet and said gas outlet communicate with said passage, and said catalyst carrier layer is an inorganic oxide coating.

In a further embodiment of the invention, plural such grooves are formed with a partition interposed between them.

In a further embodiment of the invention, plural such through-holes are formed in said groove.

According to the invention as recited above, the microreactor proper is positioned within the vacuum-tight cavity in the vacuum casing, and the vacuum-tight cavity is maintained by the getter material layer of the getter heat-generation substrate. Thus, even when the micro-reactor proper is placed in a high-temperature state, the vacuum-tight cavity effectively cuts off the conduction of heat from the microreactor proper to outside. Besides, the heat insulation effect by that vacuum-tight cavity is much higher than could be achieved with the use of other heat insulator, making it possible to place the outer wall temperature of the microreactor (vacuum casing) at normal temperature to about 50° C. without rendering the vacuum casing bulky. It is thus possible to achieve a microreactor that, albeit being of small size, holds back influences of heat on outside and makes sure higher catalytic reaction efficiency. By conducting currents through the heat generator of the getter heat-generation substrate, it is possible to activate the getter material layer without heating the microreactor from outside. It is thus possible to facilitate the initial activation of the getter material layer at the time of microreactor fabrication, and reactivate the getter material layer when the microreactor is in operation, thereby maintaining the vacuum-tight cavity in a high vacuum state. Further, the getter material layer is integral with the getter heat-generation substrate, so that it is firmly fixed in place, making the microreactor highly reliable. Furthermore, when exothermic reactions take place at the microreactor proper, the ensuing heat may be used to regularly reactivate the getter material layer, ending up with much higher energy efficiency.

BRIEF DESCRIPTION OF THE DRAWINGS

FIG. 1 is illustrative in perspective of one embodiment of the inventive microreactor.

FIG. 2 is an enlarged sectional view of the microreactor of FIG. 1 as taken on line A-A.

FIG. 5 is a taken-apart perspective view of metal substrates forming a part of the microreactor proper of FIG. 3.

FIG. 14 is a taken-apart perspective view of six metal substrates forming a part of the microreactor proper of FIG. 12.

FIG. 16 is a taken-apart perspective view of five metal substrates forming the microreactor proper of FIG. 15.

BEST MODE FOR CARRYING OUT THE INVENTION

Figure 3:
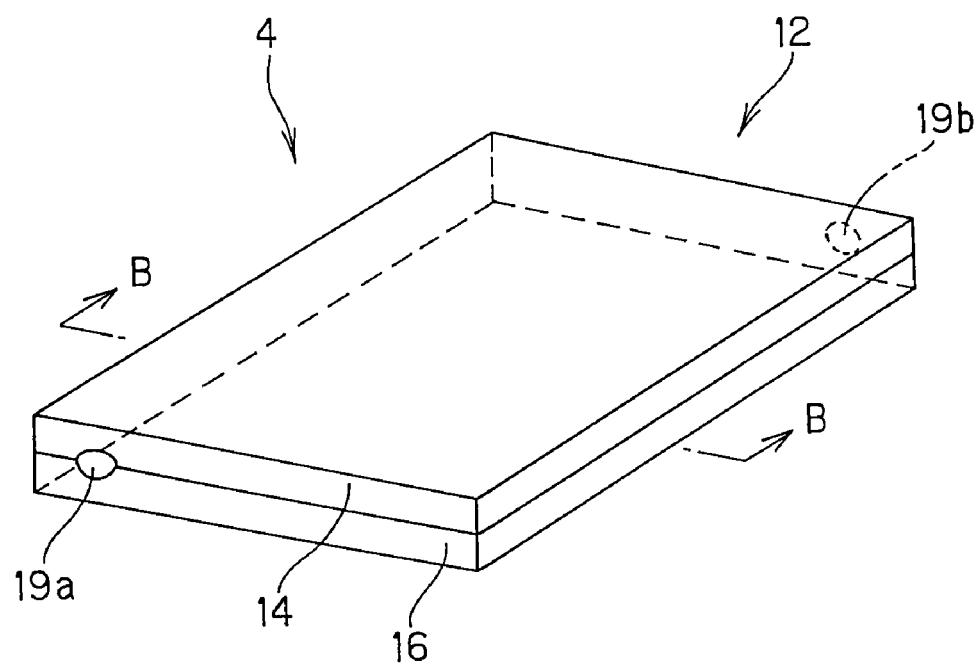
FIG. 3 is illustrative in perspective of one embodiment of the microreactor proper that forms part of the inventive microreactor.

Embodiments of the invention are now explained with reference to the drawings.

FIG. 1 is illustrative in perspective of one embodiment of the inventive microreactor, and FIG. 2 is an enlarged sectional view of the microreactor of FIG. 1 as taken on line A-A. As shown in FIGS. 1 and 2, a micro-reactor 1 comprises a vacuum casing 2, a microreactor proper 4 located in a vacuum-tight cavity 3 in the vacuum casing 2, and a getter heat-generation substrate 6 located in the microreactor proper 4. The getter heat-generation substrate 6 comprises a metal substrate 7, an electric insulating layer 8 located on the metal substrate 7, and a heat generator 9 and a getter material layer 10 that are located on the electric insulating layer 8 in mutual non-contact fashion, and the metal substrate 7 is joined to the microreactor proper 4. In FIG. 2, note that the getter material layer 10 is hatched.

The vacuum casing 2 is to provide the vacuum-tight cavity 3 around the microreactor proper 4, and may be made of, for instance, stainless, copper, aluminum, titanium, or iron. By way of illustration but not by way of limitation, the vacuum casing 2 is configured into a rectangular prism shape, as shown. The internal volume and configuration of the vacuum casing 2 may optionally be determined in consideration of the configuration and heat insulation of the microreactor proper 4; for instance, they may be determined such that the thickness of the vacuum-tight cavity 3 (the distance between the micro-reactor proper 4 and the inner wall surface of the vacuum casing 2) may be at least 1 mm, preferably in the range of 2 to 15 mm.

The microreactor proper 4 further includes a feed inlet 19a and a gas outlet 19b, and the feed inlet 19a is connected by way of a feed supply pipe 5A to outside the vacuum casing 2 while the gas outlet 19b is connected by way of a gas discharge pipe 5B to outside the vacuum casing 2.

Figure 4:
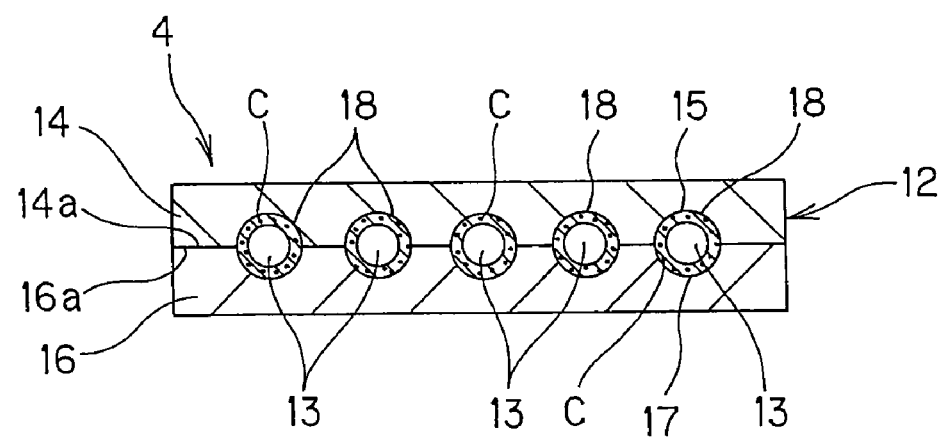
FIG. 4 is an enlarged, longitudinally sectioned view of the microreactor proper of FIG. 3 as taken on line A-A.

FIG. 3 is illustrative in perspective of one embodiment of the microreactor proper 4 that forms part of the inventive microreactor 1, and FIG. 4 is an enlarged, longitudinally sectioned view of the microreactor proper 4 of FIG. 3 as taken on line B-B. As shown in FIGS. 3 and 4, the microreactor proper 4 comprises an assembly 12 in which a metal substrate 14 having a fine groove 15 formed on one surface 14a and a metal substrate 16 having a fine groove 17 formed on one surface 16a are joined together such that the fine groove 15 is opposite to the fine groove 17. Within the assembly 12, there is a tunnel passage 13 provided that is defined by the opposite fine grooves 15 and 17, and a catalyst carrier layer 18 having a catalyst C carried on it is formed all over the inner wall surface of the tunnel passage 13, and the tunnel passage 13 communicates with the feed inlet 19a and gas outlet 19b formed on the opposite end faces of the aforesaid assembly 12.

FIG. 5 is a perspective view of the microreactor proper 4 of FIG. 3 wherein the metal substrates 14 and 16 are taken apart. Note in FIG. 5 that the catalyst carrier layer 18 is left out. Each fine groove 15, 17 meanders undisturbed through 180° turns, as shown in FIG. 5. And the fine grooves 15 and 17 form together a pattern shape symmetric relative to the joining surface of the metal substrates 14 and 16. By the joining of the metal substrates 14 and 16, therefore, the end 15a of the fine groove 15 is positioned on the end 17a of the fine groove 17 and the end 15b of the fine groove 15 is positioned on the end 17b of the fine groove 17: the fine groove 15 is in polar opposition to the fine groove 17. The ends of the tunnel passage 13 defined by such fine grooves 15 and 17 define the feed inlet 19a and gas outlet 19b, as shown in FIG. 3. Note that the configuration of the tunnel passage 13 through the microreactor proper 4, and the positions of the feed inlet 19a and gas outlet 19b are not always limited to those shown, and the positions of the feed supply pipe 5A and gas discharge pipe 5B are not limited to those shown in FIGS. 1 and 2, either.

The metal substrates 14 and 16 forming the micro-reactor proper 4 may be selected from metal materials that facilitate processing for the fine grooves 15 and 17 forming the wall surface of the tunnel passage 13 and make joining easy; for instance, use may be made of stainless, copper, aluminum, titanium, iron, or iron alloy substrates. Stainless substrates facilitate precise processing for the fine grooves 15 and 17, and make the assembly 12 tougher by means of diffusion joining, and copper ones facilitate precise processing for the fine grooves 15 and 17, and make the assembly 12 tougher by means of laser welding, resistance welding, or brazing (soldering). The thickness of the metal substrate 14, 16 may optionally be chosen from the range of, for instance, about 50 to 5,000 μm, although it may be determined while taking into account the size of the microreactor proper 4, the heat capacity, thermal conductivity or other properties of the metal used, the size of the fine grooves 15 and 17 formed, etc.

The fine grooves 15 and 17 formed on the metal substrates 14 and 16 are not exclusively limited to such configuration as shown in FIG. 5; for instance, they may optionally be configured such that a lot more catalyst C is carried in the fine grooves 15 and 17, and the passage wherein the feed contacts the catalyst C grows longer.

The inner wall surface of the fine groove 15, 17 in section perpendicular to the direction of a fluid through the tunnel passage 13 should preferably be configured into an arc, semicircular or U shape. The tunnel passage 13 defined by such fine grooves 15 and 17 may have a diameter of, for instance, about 100 to 2,000 μm and a length of, for instance, about 30 to 300 mm.

The catalyst carrier layer 18 is an inorganic oxide coating; for instance, it may be an alumina ($Al_2O_3$) coating, a mullite ($Al_2O_3.2SiO_2$) coating or the like formed by thermal spraying. Such catalyst carrier layer 18 may have a thickness optionally chosen from the range of, for instance, about 10 to 50 μm.

The catalyst C may optionally be selected depending on what purpose the microreactor 1 is used for; such as when it is used for hydrogen production, a reforming catalyst such as a Cu—Zn or Pd—Zn one or a burning catalyst such as Pt, Pd, NiO, $CO_2O_3$ or CuO may be used as the catalyst C.

Figure 6:
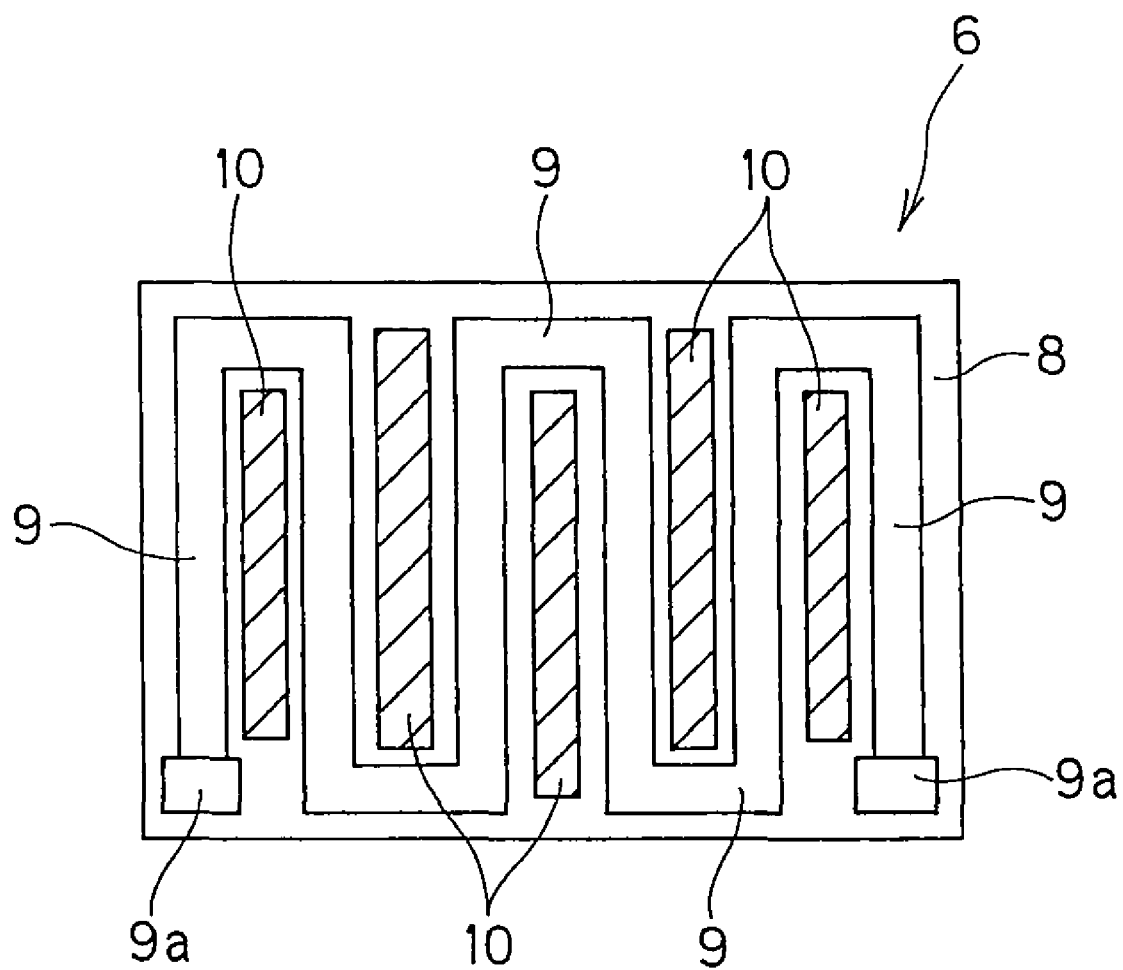
FIG. 6 is a plan view of a getter heat-generation substrate that forms a part of the microreactor of FIGS. 1 and 2.

FIG. 6 is a plan view of the getter heat-generation substrate 6 forming a part of the inventive microreactor 1. As shown in FIGS. 2 and 6, the heat generator 9 meandering undisturbed through 180° turns is formed on the electric insulating layer 8, and has electrodes 9a and 9a at both ends. And a plurality (five here) of getter material layers 10 are formed on the electric insulating layer 8 in non-contact fashion with the heat generator 9. Note in FIG. 6 that the getter material layers 10 are hatched.

The metal substrate 7 may be selected from metal materials capable of easily joining to the microreactor proper 4; for instance, use may be made of stainless, copper, aluminum, titanium, iron, and iron alloy substrates. In the invention, the metal substrate 14 that forms a part of the microreactor proper 4 may also serve as the metal substrate 7. That is, the heat generator 9 and getter material layers 10 may be formed on the metal substrate 14 via the electric insulating layer 8 in non-contact fashion.

The electric insulating layer 8, for instance, may be formed of polyimide, ceramics ($Al_2O_3$, $SiO_2$), and so on. Alternatively, the electric insulating layer 8 may be made of a metal oxide film formed by anodic oxidation of the metal substrate 7. Such electric insulating layer 8 may optionally have a thickness chosen from the range of, for instance, about 0.5 to 150 μm, although optionally determined in consideration of the properties of the material used, etc.

The heat generator 9 is to feed the heat necessary for a catalytic reaction of feed that is an endothermic reaction; materials such as carbon paste, nichrome (Ni—Cr alloy), W, Mo and Au may be used to this end. This heat generator 9 in the form of a fine wire having a width of, for instance, about 10 to 200 μm, is laid on the electric insulating layer 8 as shown in FIG. 6; however, the heat generator is by no means limited thereto, and may be configured as desired.

The current-carrying electrodes 9a and 9a provided on the heat generator 9 may be formed of conductive materials such as Au, Ag, Pd, and Pd—Ag or, alternatively, they may be formed of the same material as that of the heat generator 9. Each electrode 9a, 9a is connected to a power source outside the vacuum casing 2 by way of a wire not shown.

The getter material layer 10 is to maintain the interior of the vacuum-tight cavity 3 in the vacuum casing 2 in a vacuum state, and is placed in a non-contact state with the heat generator 9. The getter material used may be at least one of Zr, Ti, Ni, Pd and Pt or an alloy of two or more of them. There is no particular limitation on how to form such getter material layer 10; for instance, it may be formed by screen printing using a paste containing such getter materials as mentioned above. Preferably in this case, the thickness should be chosen from the range of, for instance, 10 to 150 μm. Alternatively, the getter material layer 10 may be formed by means of a vacuum film-formation process using such getter materials as mentioned above. Preferably in this case, the thickness should optionally be chosen from the range of 1 to 5 μm. It is noted that when the getter material layer 10 is formed by the vacuum film-formation process, for instance, vacuum vapor deposition using a metal mask may be relied upon.

In such inventive microreactor 1 as described above, the microreactor proper 4 is positioned in the vacuum-tight cavity 3 in the vacuum casing 2, and the vacuum-tight cavity 3 is maintained by the getter material layer 10 of the getter heat-generation substrate 6. For this reason, even when the microreactor proper 4 is forced into a high-temperature state, the vacuum-tight cavity 3 effectively cuts off the conduction of heat from the microreactor proper 4 to the vacuum casing 2; the effect of that vacuum-tight cavity 3 on heat insulation is much higher that could be achieved with other heat insulating material (for instance, glass wool, and ceramic heat insulating material), so that the outer wall temperature of the microreactor 1 (vacuum casing 2) can remain down to normal temperature to about 50° C. without rendering the microreactor 1 (vacuum casing 2) bulky.

In the fabrication of the inventive microreactor 1, for instance, the vacuum casing 2 having an opening and the microreactor proper 4 are separately prepared. Then, the microreactor proper 4 is located in the vacuum casing 2. Then, the feed inlet 19a in the microreactor proper 4 is connected to outside the vacuum casing 2 by way of the feed supply pipe 5A, and the gas outlet 19b is connected to outside the vacuum casing 2 by way of the gas discharge pipe 5B. Then, the electrodes 9a and 9a of the heat generator 9 are connected to an external power source, and the opening in the vacuum casing 2 is closed up. Thereafter, the vacuum casing 2 is evacuated through a suction port (not shown) provided in it so that the interior of the vacuum casing 2 is turned into the vacuum-tight cavity 3, followed by sealing off the suction port. Alternatively, the opening in the vacuum casing 2 may be closed up in a vacuum chamber with no provision of the aforesaid suction port for the fabrication of the inventive microreactor 1. With the inventive microreactor 1 in any case, currents are passed through the heat generator 9 of the getter heat-generator substrate 6 so that the getter material layer 10 can be activated with no application of heating to the microreactor 1 from outside: the initial activation of the getter material layer 10 can be facilitated at the time of microreactor fabrication.

Further in the inventive microreactor 1, the getter material layer 10 is positioned near the heat generator 9 so that while the microreactor 1 is in operation, the getter material layer 10 can be reactivated to maintain the vacuum-tight cavity 3 in a high vacuum state.

Integration of the getter material layer 10 with the getter heat-generation substrate 6 also makes sure its fixation to the microreactor 1.

Furthermore in the inventive microreactor 1, when exothermic reactions take place at the microreactor proper 4, it is possible to regularly carry out the reactivation of the getter material layer 10 using the ensuing heat, resulting in much more enhanced energy efficiency.

Other embodiments of the microreactor proper that forms part of the inventive microreactor are now explained by way of illustration.

Figure 7:
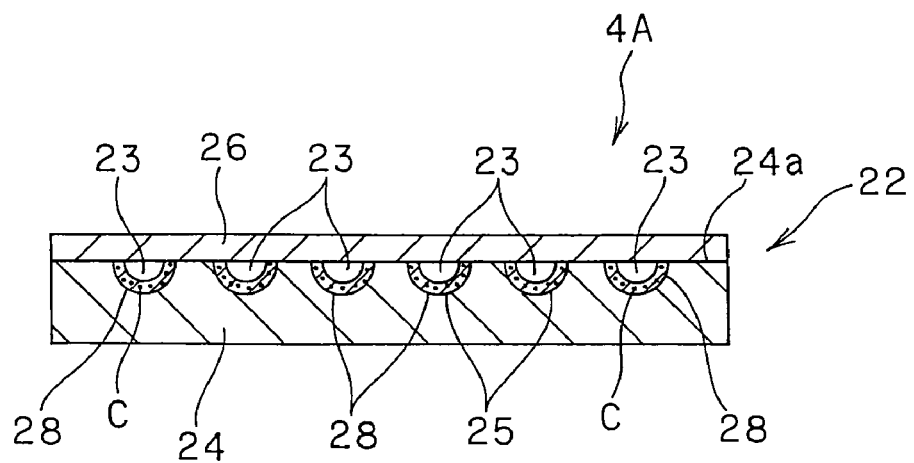
FIG. 7 is a longitudinally sectioned view, as in FIG. 4, of another embodiment of the microreactor proper forming part of the invention.

FIG. 7 is a longitudinally sectioned view, as in FIG. 4, of another embodiment of the microreactor proper that forms part of the inventive microreactor. As shown in FIG. 7, a microreactor proper 4A includes an assembly 22 comprising a metal substrate 24 having a fine groove 25 formed on one surface 24a and a metal substrate (cover member) 26 joined to the surface 24a of the metal substrate 24 in such a way as to cover the fine groove 25. Within this assembly 22, there is a tunnel passage 23 provided that is defined by the fine groove 25 and the metal substrate 26, and a catalyst carrier layer 28 having a catalyst C carried on it is located at the inner wall surface of the fine groove 25.

As is the case with the fine groove 15, 17 shown in FIG. 5, the fine groove 25 on the metal substrate 24 may limited to that. The fine groove 25 may have an arc, semicircular, U or other shape in section, and one open end of the tunnel passage 23 provides a feed inlet (not shown) while the other open end provides a gas outlet (not shown).

For the metal substrate 24 and metal substrate (cover member) 26 forming such microreactor proper 4A, use may be made of similar materials to those of the metal substrates 14 and 16 in the foresaid embodiment. The thickness of the metal substrate 24 may optionally be chosen from the range of, for instance, about 50 to 5,000 μm, although it may be determined while taking into account the size of the microreactor proper 4A, the heat capacity, thermal conductivity or other properties of the metal used, the size of the fine groove 25 formed, etc. The thickness of the metal substrate 26 may optionally be chosen from the range of, for instance, 20 to 2,000 μm, although it may be determined in consideration of the material used, etc.

The catalyst carrier layer 28 that forms a part of the microreactor proper 4A may be similar to the catalyst carrier layer 18 in the aforesaid embodiment.

Figure 8:
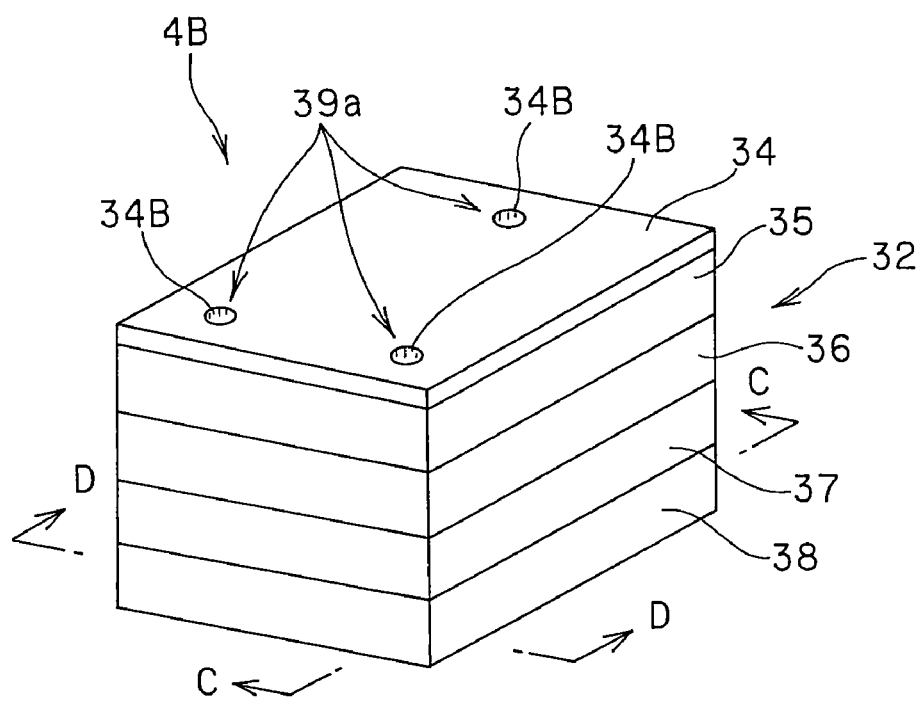
FIG. 8 is illustrative in perspective of yet another embodiment of the microreactor forming part of the invention.
Figure 9:
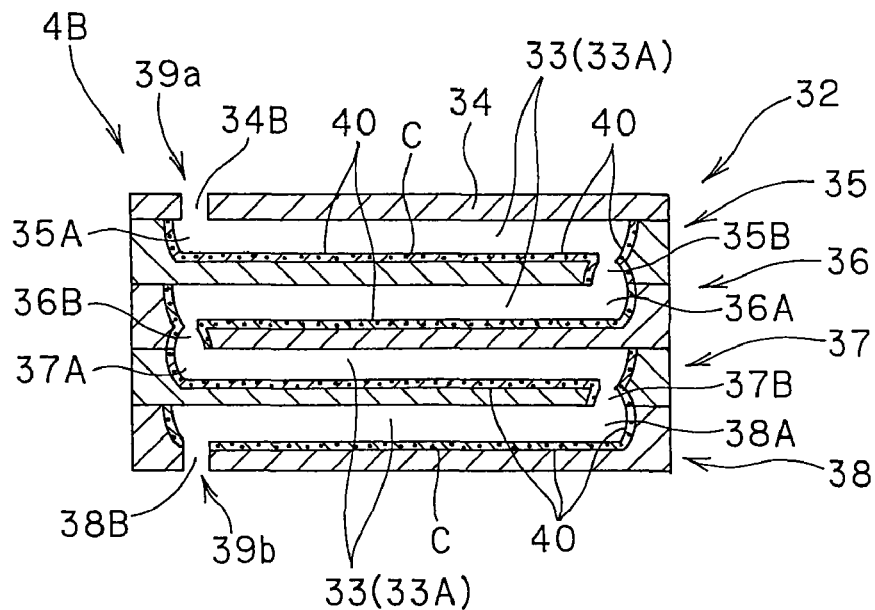
FIG. 9 is an enlarged, longitudinally sectioned view of the microreactor of FIG. 8 as taken on line C-C.
Figure 10:
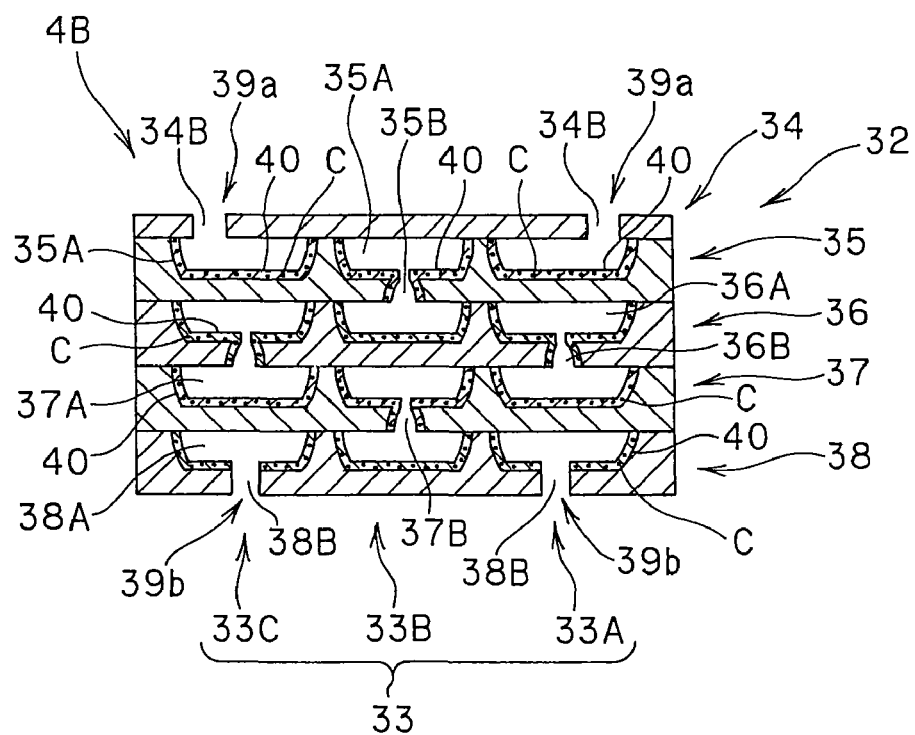
FIG. 10 is an enlarged, longitudinally sectioned view of the microreactor of FIG. 8 as taken on line D-D.

FIG. 8 is illustrative in perspective of yet another embodiment of the microreactor proper that forms part of the inventive microreactor; FIG. 9 is an enlarged, longitudinally sectioned view of the microreactor proper of FIG. 8 as taken on line C-C; and FIG. 10 is an enlarged, longitudinally sectioned view of the microreactor proper of FIG. 8 as taken on line D-D. As shown in FIGS. 8, 9 and 10, a microreactor proper 4B comprises an assembly 32 in which five metal substrates 34, 35, 36, 37, 38 are stacked and joined together. Of the five metal substrates 34, 35, 36, 37, 38, the metal substrate 34 that is one of the outermost layers functions as a cover member, and has three through-holes 34B in given positions. Three intermediate metal substrates 35, 36, 36 and the outermost metal substrate 38 comprise three rows of grooves 35A, 36A, 37A, 38A on one surfaces (facing the metal substrate 34) that are separated by partitions, and the grooves 35A, 36A, 37A, 38A comprise through-holes 35B, 36B, 37B, 38B, respectively. And three rows of grooves 35A, 36A, 37A, 38A communicate with one another via the through-holes 35B, 36B, 37B, respectively, in the stacking direction. In other words, there are three zigzag passages (33A, 33B, 33C) running from the through-hole 34A in the metal substrate 34 down along the way of groove 35A→through-hole 35B→groove 36A→through-hole 36B→groove 37A→through-hole 37B→groove 38A→through-hole 38B.

A catalyst carrier layer 40 having a catalyst C carried on it is located at each of the grooves 35A, 36A, 37A, 38A on the four metal substrates 35, 36, 37, 38 constituting the three passages 33A, 33B, 33C as mentioned above, and at each of the inner wall surfaces of the through-holes 35B, 36B, 37B in the three metal substrates 35, 36, 37. And the three through-holes 34B in the metal substrate 34 provide feed inlets 39a for the three passages 33A, 33B, 33C, and the three through-holes 38B in the outermost metal substrate 38 provide gas outlets 39b for the three passages 33A, 33B, 33C.

Figure 11:
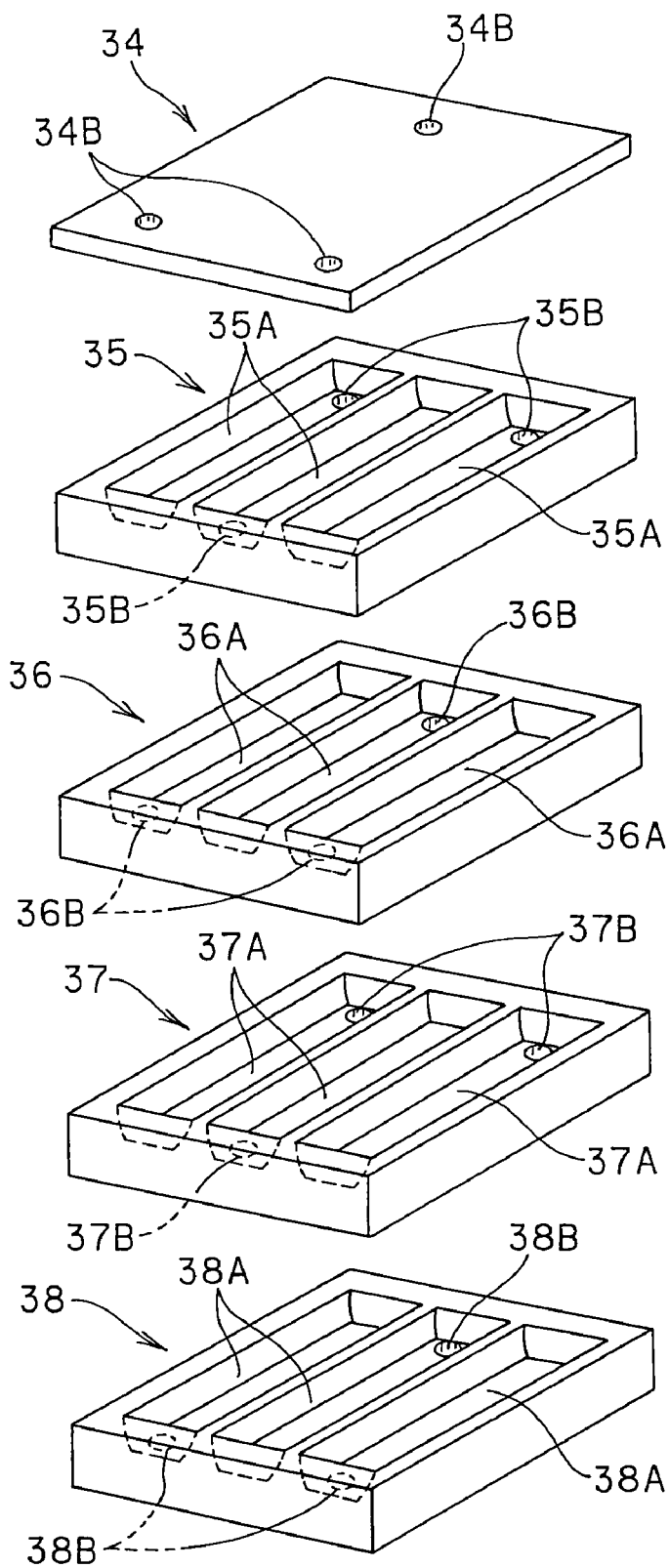
FIG. 11 is a taken-apart perspective view of five metal substrates forming the microreactor proper of FIG. 8.

FIG. 11 is a taken-apart perspective view of the five metal substrates 34, 35, 36, 37, 38 forming part of the microreactor proper 4B of FIG. 8. Note in FIG. 11 that the catalyst carrier layer 40 is left out. As shown in FIG. 11, the metal substrate 35, 36, 37, 38 is provided with three rows of grooves 35A, 36A, 37A and 38A separated by partitions, and one end of each groove 35A, 36A, 37A, 38A is provided with a through-hole 35B, 36B, 37B, 38B. Of three zigzag passages 33 in the embodiment illustrated, the passages 33A, 33C are designed such that a fluid flows in the grooves 35A, 36A, 37A, 38A in the same direction, whereas the fluid flows through the passage 33B in the opposite direction.

For the five metal substrates 34, 35, 36, 37 and 38 forming part of the microreactor proper 4B, use may be made of similar materials to those of the metal substrates 14 and 16 in the foregoing embodiment. The thickness of the metal substrate 35, 36, 37, 38 may optionally be chosen from the range of, for instance, about 50 to 5,000 μm, although it may be determined while taking into account the size of the microreactor proper 4B, the heat capacity, thermal conductivity or other properties of the metal used, the size of the necessary groove 35A, 36A, 37A, 38A, etc. The thickness of the metal substrate 34 may optionally be chosen from the range of, for instance, 20 to 2,000 μm, although it may be determined in consideration of the material used, etc.

The catalyst carrier layer 40 forming a part of the microreactor proper 4B may be similar to the catalyst carrier layer 18 in the foregoing embodiment.

Regarding the aforesaid microreactor proper 4B, it is noted that there is no limitation on the direction of the fluid flowing in each passage 33A, 33B, 33C; the fluid may flow from the substrate 38 toward the substrate 34, opposite to the direction illustrated. In this case, the three feed inlets 39a and the three gas outlets 39b are reversed, and the positions of three feed inlets 39a and the positions of three gas outlets 39b are not always limited to those illustrated.

The catalyst carrier layer 40 having the catalyst C carried on it may also be located on the surface of the metal substrate 34 (exposed on the side of the groove 35A). Further, the catalyst carrier layer 40 having the catalyst C carried on it may be located on the surface of each metal substrate 35, 36, 37 (exposed on the groove 36A, 37A, 38A). This allows a lot more catalyst C to be carried, resulting in improvements in reaction efficiency and effective use of space.

Figure 12:
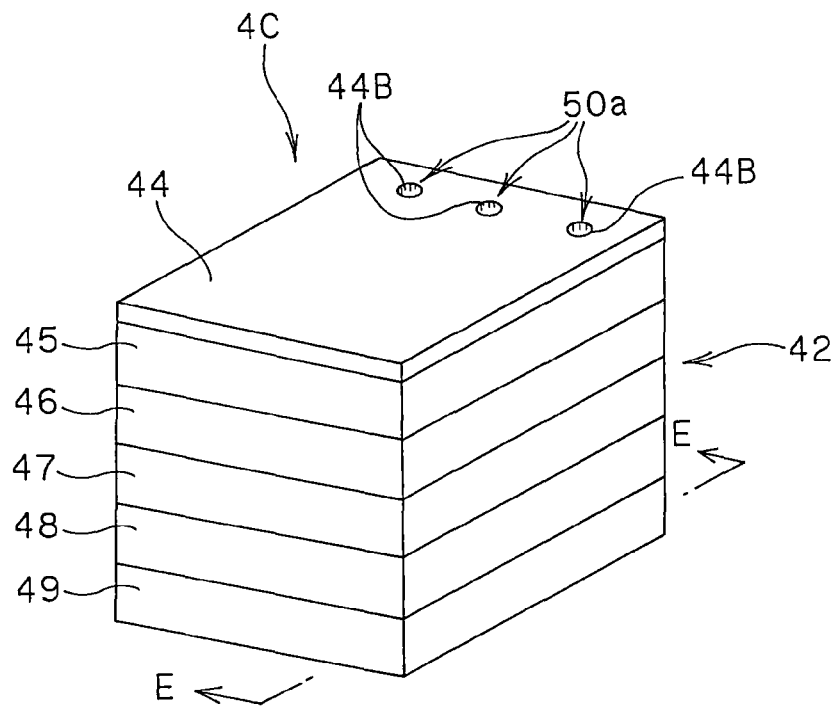
FIG. 12 is illustrative in perspective of a further embodiment of the microreactor proper forming part of the invention.
Figure 13:
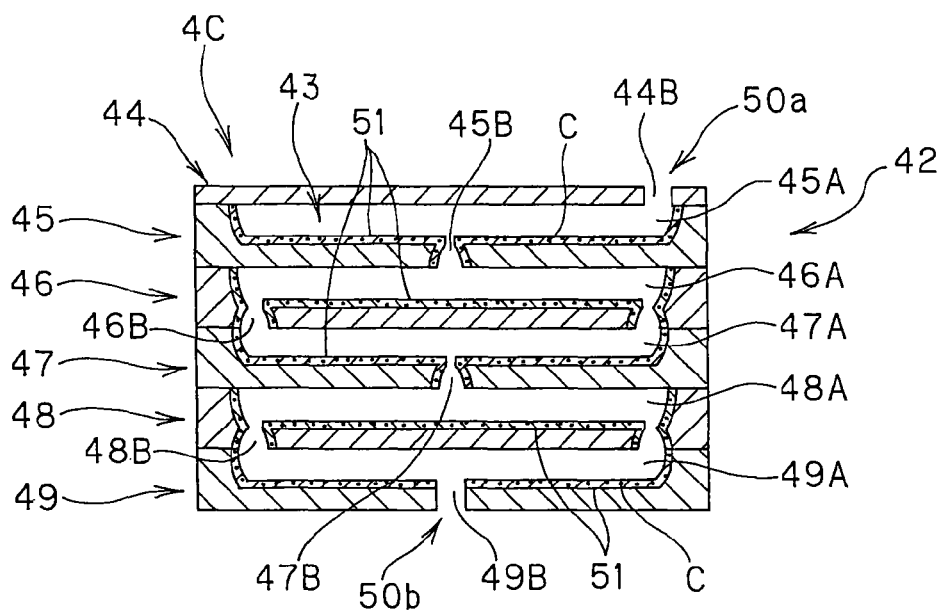
FIG. 13 is an enlarged, longitudinally sectioned view of the microreactor proper of FIG. 12 as taken on line E-E.

FIG. 12 is illustrative in perspective of a further embodiment of the microreactor proper forming part of the inventive microreactor, and FIG. 13 is an enlarged, longitudinally sectioned view of the microreactor proper of FIG. 12 as taken on line E-E. As shown in FIGS. 12 and 13, a microreactor proper 4C comprises an assembly 42 wherein six metal substrates 44, 45, 46, 47, 48, 49 are stacked and joined together. FIG. 14 is a taken-apart perspective view of the six metal substrates 44, 45, 46, 47, 48, 49 forming the microreactor 4C of FIG. 12. Note in FIG. 14 that the catalyst carrier layer 51 to be described later is left out.

Of the aforesaid six metal substrates 44, 45, 46, 47, 48, 49, the metal substrate 44 that is one of the outermost layers functions as a cover member, and includes three through-holes 44B in a row in substantially the center. Four intermediate metal substrates 45, 46, 47, 48 and another outermost metal substrate 49 comprise on one surfaces (facing the metal substrate 44) three rows of grooves 45A, 46A, 47A, 48A, 49A lined up via partitions, respectively. The grooves 45A, 47A, 49A on the three metal substrates 45, 47, 49 each include one through-hole 45B, 47B, 49B in substantially the center. On the other hand, the grooves 46A, 48A on the two metal substrates 46, 48 are each provided with a total of two through-holes 46B, 48B, one at each end. And the three rows of grooves 45A, 46A, 47A, 48A, 49A communicate with one another in the stacking direction via the through-holes 45B, 46B, 47B, 48B, respectively. In other words, there are three passages 43 (43A, 43B, 43C, of which 43A is shown in FIG. 13), running from each through-hole 44B in the metal substrate 44 down along the way of groove 45A→one through-hole 45B→groove 46A→two through-holes 46B→groove 47A→one through-hole 47B→groove 48A→two through-holes 48B→groove 49A→one through-hole 49B, wherein a fluid makes its way while undergoing repeated merging and branching.

A catalyst carrier layer 51 having a catalyst C carried on it is located at each of the grooves 45A, 46A, 47A, 48A, 49A in the five metal substrates 45, 46, 47, 48, 49 constituting the three passages 43A, 43B, 43C as mentioned above, and at each of the inner wall surfaces of the through-holes 45B, 46B, 47B, 48B in the four metal substrates 45, 46, 47, 48. And the three through-holes 44B in the metal substrate 44 provide feed inlets 50a for the three passages 43A, 43B, 43C, and the three through-holes 49B in the outermost metal substrate 49 provide gas outlets 50b for the three passages 43A, 43B, 43C.

For the six metal substrates 44, 45, 46, 47, 48, 49 forming part of such microreactor proper 4C, use may be made of similar materials to those of the metal substrates 14 and 16 in the foregoing embodiment. The thickness of the metal substrate 45, 46, 47, 48, 49 may optionally be chosen from the range of, for instance, about 50 to 5,000 μm, although it may be determined while taking into account the size of the microreactor proper 4C, the heat capacity, thermal conductivity or other properties of the metal used, the size of the necessary groove 45A, 46A, 47A, 48A, 49A, etc. The thickness of the metal substrate 44 may optionally be chosen from the range of, for instance, 20 to 2,000 μm, although it may be determined in consideration of the material used, etc.

The catalyst carrier layer 51 forming a part of the microreactor proper 4C may be similar to the catalyst carrier layer 18 in the foregoing embodiment.

Regarding the aforesaid microreactor proper 4C, it is noted that there is no limitation on the direction of the fluid flowing in each passage 43A, 43B, 43C; the fluid may flow from the substrate 49 toward the substrate 44, opposite to the direction illustrated. In this case, the three feed inlets 50a and the three gas outlets 50b are reversed, and both the positions of three feed inlets 50a and the positions of three gas outlets 50b are not always limited to those illustrated.

The catalyst carrier layer 51 having the catalyst C carried on it may also be located on the surface of the metal substrate 44 (exposed on the side of the groove 45A). Further, the catalyst carrier layer 51 having the catalyst C carried on it may be located on the surface of each metal substrate 45, 46, 47, 48 (exposed on the groove 46A, 47A, 48A, 49A). This allows a lot more catalyst C to be carried, resulting in improvements in reaction efficiency and effective use of space.

Figure 15:
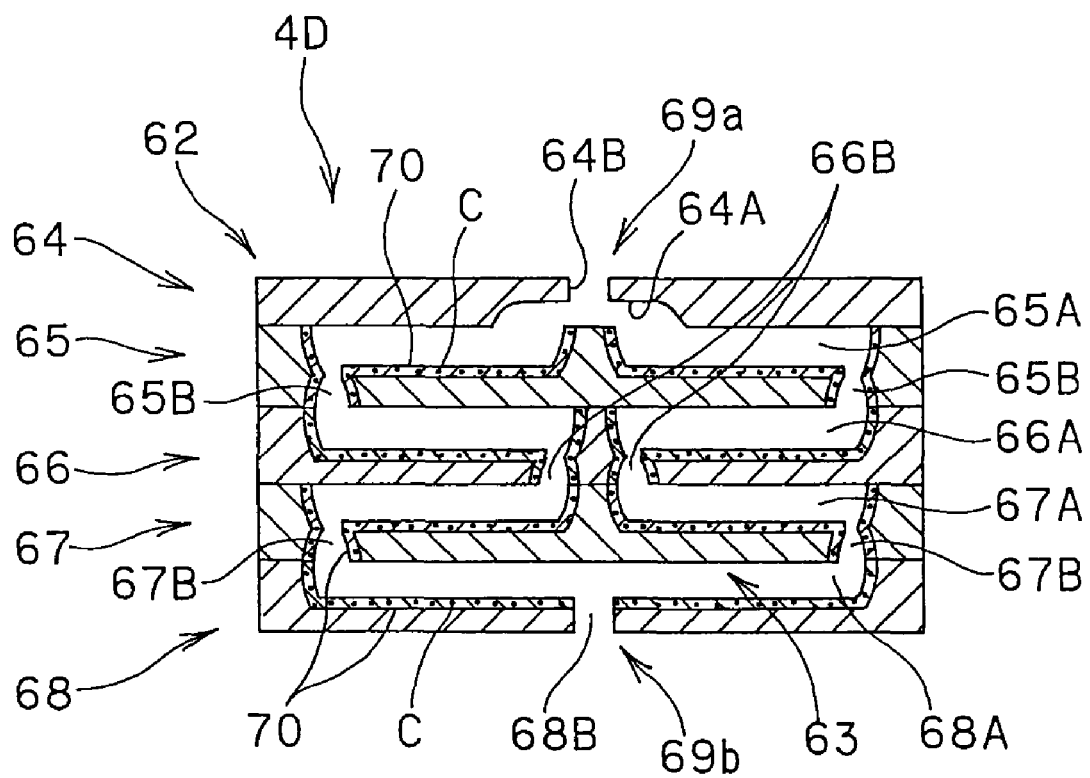
FIG. 15 is a longitudinally sectioned view, as in FIG. 9, of a further embodiment of the microreactor proper forming part of the invention.

FIG. 15 is a longitudinally sectioned view, as in FIGS. 9 and 13, of a further embodiment of the micro-reactor proper that forms part of the inventive micro-reactor. As shown in FIG. 15, a microreactor proper 4D comprises an assembly 62 wherein five metal substrates 64, 65, 66, 67, 68 are stacked and joined together. FIG. 16 is a taken-apart perspective view of the five metal substrates 64, 65, 66, 67, 68 forming part of the micro-reactor proper 4D of FIG. 15. Note in FIG. 16 that the catalyst carrier layer 70 to be described later is let out.

Of the aforesaid metal substrates 64, 65, 66, 67, 68, the metal substrate 64 that is one of the outermost layers functions as a cover member, and includes one groove 64A extending over six grooves 65A on the metal substrate 65 to be describe later, and one through-hole 64B at substantially the center. The intermediate metal substrates 65, 66, 67 each include six grooves 65A, 66A, 67A on one surface (facing the metal substrate 64). On the other hand, another outermost metal substrate 68 includes on one surface (facing the metal substrate 64) one groove 68A corresponding to the groove 64A on the metal substrate 64, and the grooves 65A, 66A, 67A on the three metal substrates 65, 66, 67 are provided with through-holes 65B, 66B, 67B, respectively. The groove 68A on the metal substrate 68 is provided with one through-hole 68B. And the grooves 65A, 66A, 67A, 68A communicate with one another in the stacking direction via the plurality of through-holes 65B, 66B, 67B, respectively. After entering the groove 64A from the one through-hole 64B in the metal substrate 64, a fluid flows through six independent passages 63 running all the way from groove 65A→through-holes 65B→grooves 66A→through-holes 66B→grooves 67A→through-holes 67B to groove 68A.

A catalyst carrier layer 70 having a catalyst C carried on it is located at each of the grooves 65A, 66A, 67A, 68A in the four metal substrates 65, 66, 67, 68 constituting the six independent passages 63 as mentioned above, and at each of the inner wall surfaces of the through-holes 65B, 66B, 67B in the three metal substrates 65, 66, 67. And the one through-hole 64B in the metal substrate 64 provides a feed inlet 69a for the passages 63 and the one through-hole 68B in the outermost metal substrate 68 provides a gas outlet 69b for the passages 63.

For the five metal substrates 64, 65, 66, 67, 68 forming part of such microreactor proper 4D, use may be made of similar materials to those of the metal substrates 14 and 16 in the foregoing embodiment. The thickness of the metal substrate 65, 66, 67, 68 may optionally be chosen from the range of, for instance, about 50 to 5,000 μm, although it may be determined while taking into account the size of the microreactor proper 4D, the heat capacity, thermal conductivity or other properties of the metal used, the size of the necessary groove 65A, 66A, 67A, 68A, etc. The thickness of the metal substrate 64 may optionally be chosen from the range of, for instance, 20 to 2,000 μm, although it may be determined in consideration of the material used, the size of the necessary groove 64A, etc.

The catalyst carrier layer 70 forming a part of the microreactor proper 4D may be similar to the catalyst carrier layer 18 in the foregoing embodiment.

Regarding the aforesaid microreactor proper 4D, too, it is noted that there is no limitation on the direction of the fluid flowing in each passage 63; the fluid may flow from the substrate 68 toward the substrate 64, opposite to the direction illustrated. In this case, the feed inlet 69a and the outlet 69b are reversed, and both the position of the feed inlet 69a and the position of the gas outlet 69b are not always limited to those illustrated.

The catalyst carrier layer 70 having the catalyst C carried on it may also be located on the groove 64A on the metal substrate 64. Further, the catalyst carrier layer 70 having the catalyst C carried on it may be located on the surface of each metal substrate 65, 66, 67 (exposed on the groove 66A, 67A, 68A). This allows a lot more catalyst C to be carried, resulting in improvements in reaction efficiency and effective use of space.

Although there are six independent passages 63 in the embodiment of FIGS. 15 and 16, it is understood that if a lot more grooves 65A, 66A, 67A are formed on the metal substrates 65, 66, 67, there are a lot more passages formed.

By way of illustration but not by way of limitation, the above embodiments are provided.

The invention is now explained more specifically with reference to more specific examples.

EXAMPLE 1

A 1-mm thick SUS316L substrate (25 mm×25 mm) was readied up for a metal substrate, and a photosensitive resist material (OFPR made by Tokyo Ohka Kogyo Co., Ltd.) was coated on each surface of SUS316L by dipping (at a post-drying thickness of 7 μm). Then, a photomask configured such that striped light block portions of 1,500 μm in width extending alternately 20 mm from the left and right sides at a pitch of 2,000 μm was located on the resist coating of the SUS316L substrate on the side to be provided with fine grooves. Besides, a photoresist material was likewise coated on a similar SUS316L substrate as mentioned above, followed by the location of a photomask on the resist coating of the SUS316L substrate on the side to be provided with fine grooves. This photo-mask was of plane symmetry about the first-mentioned photomask with respect to the SUS316L substrate plane.

Then, the resist coatings of the aforesaid one set of SUS316L substrates were exposed to light through the respective photomasks, and developed with a sodium hydrogen carbonate solution, thereby forming on one surface of each SUS316L substrate a resist pattern wherein striped openings of 500 μm in width were lined up at a pitch of 2,000 μm and the adjacent striped openings were alternately contiguous to each other at the ends.

Then, using the aforesaid resist pattern as a mask, the SUS316L substrates were etched (for 3 minutes) under the following conditions.

(Etching Conditions)
Temperature: 50° C.
Etchant (ferric chloride solution) specific weight concentration: 45 Baumes (° B'e)

As a result, one set of SUS316L substrates was provided on its one surface with a striped form of fine groove having a width of 1,000 μm, a depth of 650 μm and a length of 20 mm at a pitch 2,000 μm: there was a fine groove (with a passage length of 220 mm) configured such that the adjacent groove portions were alternately contiguous to each other at the ends (meandering undisturbed through 180° turns as shown in FIG. 5). The inner wall surface of the fine groove was of almost semicircular shape in section perpendicular to the direction of flow of a fluid.

By means of plasma spray, alumina was thermally sprayed to the surface of one set of SUS316L substrates provided with such a fine groove as mentioned above. Then, the resist pattern was removed using a sodium hydroxide solution, followed by washing with water. Removal of the resist pattern enabled the unnecessary alumina sprayed film to be lifted off, forming a catalyst carrier layer (30 μm in thickness) in the fine groove.

Then, the aforesaid one set of SUS316L substrates was diffusion joined together such that the fine grooves were opposite to each other under the following conditions, thereby making an assembly. For this joining operation, one set of substrates was aligned such that the fine grooves were in polar opposition to each other. As a consequence, there was a tunnel passage formed in the assembly, with the feed inlet and gas outlet lying at the opposite end faces of the assembly.

(Diffusion Joining Conditions)
Atmosphere: in vacuo
Joining Temperature: 1,000° C.
Joining Time: 12 hours Then, a catalyst suspension having the following composition was filled in the passage in the assembly and allowed to stand alone (for 15 minutes), after which it was removed from there, and drying and reduction was applied at 120° C. for 3 hours to carry the catalyst all over the surface of the passage.

(Composition of the Catalyst Suspension)
Al: 5.4 wt %
Cu: 2.6 wt %
Zn: 2.8 wt %
Si Binder (Snowtex O made by Nissan Chemistry Industries, Co., Ltd.): 5.0 wt %
Water: the balance Then, a 100-μm thick SUS316L substrate (25 mm×25 mm) was readied up as a metal substrate and an electric insulating layer (of 0.4 μm in thickness) composed of silicon oxide was formed by sputtering on that SUS316L substrate.

Then, gold was vacuum deposited on that electric insulating layer by way of a metal mask, thereby forming a heat generator laid out at a wire width of 100 μm and a wire spacing of 100 μm with 180° turns, as shown in FIG. 6, and connecting two electrodes (of 0.5 mm×0.5 mm) to both ends of that heat generator. Further, a non-evaporation type getter material (made by SAES Getters Co., Ltd.) was printed by screen printing in the desired pattern to form a 100-μm thick getter material layer in non-contact fashion with the electric insulating layer as shown in FIG. 6, thereby obtaining a getter heat-generation substrate.

Then, the SUS316L substrate of that getter heat-generation substrate was joined to one surface of the aforesaid assembly under the same conditions as mentioned above.

There was thus a microreactor proper (having an outer size of 25 mm×25 mm×about 2.1 mm) prepared.

On the other hand, a 1.0-mm thick SUS316L substrate was formed into a casing in the form of a rectangular prism having an inner measure of 35 mm×35 mm×4.1 mm, and with an opening defined by a plane of 35 mm×35 mm. This casing was provided with one through-hole for inserting a feed supply pipe in a wall surface of 35 mm×4.1 mm, two through-holes for the insertion of wires, and a suction port. To close up the aforesaid opening, there was a lid member of 34 mm×34 mm prepared with one through-hole for the insertion of a gas discharge pipe.

Then, the feed supply pipe and the gas discharge pipe were connected to a feed inlet and a gas outlet of the aforesaid microreactor proper, respectively, and wires were connected to the electrodes of the heat generator, respectively. And the microreactor proper was located in the casing such that the feed supply pipe was inserted into the aforesaid through-hole with its end projecting out of the casing. The wires connected to the electrodes of the heat generator were inserted through the aforesaid through-hole for connection to an external power source. Then, the aforesaid lid member was diffusion joined to the opening in the casing with the gas discharge pipe inserted into the through-hole to close up the opening, thereby obtaining a vacuum casing. The conditions for diffusion joining were the same as those for the aforesaid diffusion joining. In this state, the inner wall of the casing was kept away from the microreactor proper via a space having a width of 1 to 5 mm in non-contact fashion.

Then, evacuation was carried out via the suction port to let the vacuum casing have a vacuum degree of $10^{-2}$ Pa inside, after which the suction port was sealed up by welding to form a vacuum-tight cavity.

Then, currents (150 mA) were conducted through the heat generator to generate heat, thereby effecting the initial activation of the getter material layer.

There could thus be the inventive microreactor obtained.

EXAMPLE 2

Four 1-mm thick SUS316L substrates (25 mm×25 mm) were readied up as metal substrates. Both surfaces of these SUS316L substrates were coated by dipping with a photosensitive resist material (OFPR made by Tokyo Ohka Kogyo Co., Ltd.) (at a post-drying thickness of 7 μm). Then, a photomask having three rows of rectangular (6 mm×20 mm) light-block portions at a pitch of 7 mm was located on the resist coating on the surface of each SUS316L substrate to be grooved, while a photomask having three 4-mm diameter circular light-block portions at a pitch of 7 mm was located on the resist coating on the opposite surface of each SUS316L substrate. Then, the resist coatings were exposed to light via the photomasks, and developed with a sodium hydrogen carbonate solution, whereby there was a resist pattern formed, in which rectangular openings (of 6 mm×20 mm) were lined up on one surface of each USU316L substrate at a pitch of 7 mm in three rows, three 4-mm diameter circular openings were lined up on the opposite surface at a pitch of 7 mm, and the respective circular openings were positioned at the ends in the same direction of the respective rectangular openings by way of the SUS316L substrates.

Then, using the aforesaid resist pattern as a mask, each SUS316L substrate was etched (for 3 minutes) from both its surface under the following conditions.

(Etching Conditions)
Temperature: 50° C.
Etchant (ferric chloride solution) specific weight concentration: 45 Baumes (° B'e)

As a result, grooves each having a rectangular opening (6 mm×20 mm) and a depth of 750 μm were formed on one surface of each SUS316L substrate at a pitch of 7 mm in three rows, and three through-holes each having an opening diameter of 4 mm and a 3.5-mm diameter opening end at the end of the aforesaid groove were formed on the opposite surface at a pitch of 7 mm.

Alumina was thermally sprayed by plasma spraying to the grooved surfaces of the four SUS316L substrates provided with grooves and through-holes as mentioned above.

Then, the resist pattern was removed using a sodium hydrogen solution, followed by washing with water. Removal of the resist pattern enabled the unnecessary alumina sprayed film to be lifted off, forming catalyst carrier layers composed of alumina sprayed films (of 30 μm in thickness) within the grooves and through-holes. Note here that the through-hole in the SUS316L substrate that was the outermost layer was polished by drilling to remove the alumina sprayed film and form a straight through-hole having an opening diameter of 4 mm.

A 100-mm thick SUS316L substrate was readied up as a cover member, and three through-holes were formed through this SUS316L substrate by resist pattern formation and etching from one surface. Each through-hole was 4 mm in the diameter of one opening and 3.5 mm in the diameter of another opening, and had a pitch of 7 mm.

Then, the aforesaid four SUS316L substrates were stacked and aligned such that the grooved surfaces were in the same direction and the through-holes were alternately positioned on the other end side. The SUS316L substrate working as the aforesaid cover member was stacked and aligned in such a way as to cover the groove on the uppermost SUS316L substrate and place the through-holes on the other end side (see FIG. 9).

Then, diffusion joining was carried out under the following conditions to prepare an assembly.

(Diffusion Joining Conditions)
Atmosphere: in vacuo
Joining Temperature: 1,000%
Joining Time: 12 hours As a result, there were three feed inlets in the outermost SUS substrate (of 100 μm in thickness) of the assembly; there were three gas outlets in the opposite outermost SUS316L substrate (of 1 mm in thickness) of the assembly; and there were three passages running zigzag in the stacking direction in the assembly.

Then, a similar catalyst suspension as in Example 1 was filled in the passages in the assembly and allowed to stand alone (for 15 minutes), after which it was removed from there, and drying was applied at 120° C. for 3 hours to carry the catalyst all over the surfaces of the passages.

Then, an electric insulating layer (of 0.4 μm in thickness) composed of silicon oxide was formed by sputtering on one SUS316L substrate (of 100 μm in thickness) forming a part of the aforesaid assembly.

Then, Au was vacuum deposited on that electric insulating layer by way of a metal mask, thereby forming a heat generator 9 laid out at a wire width of 100 μm and a wire spacing of 100 μm with 180° turns as shown in FIG. 6, and connecting two electrodes (of 0.5 mm×0.5 mm) to both ends of that heat generator. Further, a non-evaporation type getter material (made by SAES Getters Co., Ltd.) was printed by screen printing in the desired pattern to form a 100-μm thick getter material layer in non-contact fashion with the heat generator as shown in FIG. 6, thereby forming a getter heat-generation substrate on one surface of the assembly.

There was thus a microreactor proper (having an outer size of 25 mm×25 mm×about 4.1 mm) prepared.

On the other hand, a 1.0-mm thick SUS316L substrate was formed into a rectangular prism casing having an inner measure of 35 mm×35 mm×6.1 mm, and with an opening defined by a plane of 35 mm×6.1 mm. This casing was provided with three through-holes for inserting a feed supply pipe in a wall surface of 35 mm×35 mm, two through-holes for the insertion of wires, and a suction port. To close up the aforesaid opening, there was a lid member of 34 mm×6.0 mm prepared with three through-holes for the insertion of a gas discharge pipe.

Then, the feed supply pipes and the gas discharge pipes were connected to three feed inlets and three gas outlets of the aforesaid microreactor proper, respectively, and wires were connected to the electrodes of the heat generator, respectively. And the microreactor proper was located in the casing such that the three feed supply pipes were inserted into the aforesaid respective through-holes with their ends projecting out of the casing. The wires connected to the electrodes of the heat generator were inserted through the aforesaid through-holes for connection to an external power source. Then, the aforesaid lid member was diffusion joined to the opening in the casing with the gas discharge pipes inserted into the through-holes to close up the opening, thereby obtaining a vacuum casing. The conditions for diffusion joining were the same as those for the aforesaid diffusion joining. In this state, the inner wall of the casing was kept away from the micro-reactor proper via a space having a width of 1 to 5 mm in non-contact fashion.

Then, evacuation was carried out via the suction port to let the vacuum casing have a vacuum degree of $10^{-2}$ Pa inside, after which the suction port was sealed up by welding to form a vacuum-tight cavity.

Then, currents (150 mA) were conducted through the heat generator to generate heat, thereby effecting the initial activation of the getter material layer.

There could thus be the inventive microreactor obtained.

INDUSTRIAL APPLICABILITY

The present invention may find applications in fields where the desired reactions are kept going on by a carried carrier, for instance, for hydrogen production involving reactions such as the reforming of methanol, and removal of carbon monoxide by oxidization.

What is claimed is:

1. A microreactor, characterized by comprising a vacuum casing, a microreactor proper located in a vacuum-tight cavity in said vacuum casing, and a getter heat-generation substrate positioned on at least one surface of said microreactor proper, wherein:
    said microreactor proper has a feed inlet and a gas outlet, wherein said feed inlet is connected to outside said vacuum casing by way of a feed supply pipe and said gas outlet is connected to outside said vacuum casing by way of a gas discharge pipe, and
    said getter heat-generation substrate comprises a substrate, and a heat generator and a getter material layer that are located on said substrate alternately in a mutual non-contact state.

2. The microreactor of claim 1, wherein said substrate of said getter heat-generation substrate is a metal substrate, and said heat generator and said getter material layer are located on said metal substrate via an electric insulating layer.

3. The microreactor of claim 1, wherein said substrate of said getter heat-generation substrate is a metal substrate forming said microreactor proper, and said heat generator and said getter material layer are located on said metal substrate via an electric insulating layer.

4. The microreactor of claim 1, wherein said microreactor proper comprises an assembly wherein one set of metal substrates are joined together, a tunnel passage defined by a fine groove formed on a joining surface of at least one of said one set of metal substrates, a catalyst carrier layer formed at said tunnel passage, and a catalyst carried on said catalyst carrier layer, wherein said feed inlet and said gas outlet communicate with said tunnel passage, and said catalyst carrier layer is an inorganic oxide coating.

5. The microreactor of claim 1, wherein said microreactor proper comprises an assembly wherein three or more metal substrates are stacked and joined together, a passage formed within said assembly, a catalyst carrier layer formed at said passage and a catalyst carried on said catalyst carrier layer, wherein at least an intermediate metal substrate has a groove formed on at least one joining surface, and a through-hole formed in said groove, said passage is defined by said groove and said through-hole, said feed inlet and said gas outlet communicate with said passage, and said catalyst carrier layer is an inorganic oxide coating.

6. The microreactor of claim 5, wherein plural such grooves are formed by way of a partition.

7. The micro reaction of claim 5, wherein plural such through-holes are formed in said groove.

* * * * *